(12) United States Patent
　　　Picaut

(10) Patent No.: US 10,953,645 B2
(45) Date of Patent: Mar. 23, 2021

(54) METHOD FOR PRODUCING A SANDWICH METAL PART HAVING A NON-DEVELOPABLE SHAPE

(71) Applicant: Halcyon, Chantepie (FR)

(72) Inventor: Gwenaël Picaut, Chantepie (FR)

(73) Assignee: HALCYON, Chantepie (FR)

( * ) Notice: Subject to any disclaimer, the term of this patent is extended or adjusted under 35 U.S.C. 154(b) by 305 days.

(21) Appl. No.: 15/576,045

(22) PCT Filed: May 19, 2016

(86) PCT No.: PCT/EP2016/061206
§ 371 (c)(1),
(2) Date: Nov. 21, 2017

(87) PCT Pub. No.: WO2016/188834
PCT Pub. Date: Dec. 1, 2016

(65) Prior Publication Data
US 2018/0154625 A1　　Jun. 7, 2018

(30) Foreign Application Priority Data

May 22, 2015　(FR) .................................... 15 54611

(51) Int. Cl.
　　*B32B 37/14*　　(2006.01)
　　*B32B 37/12*　　(2006.01)
　　(Continued)

(52) U.S. Cl.
　　CPC .............. *B32B 37/146* (2013.01); *B32B 1/00* (2013.01); *B32B 3/12* (2013.01); *B32B 7/12* (2013.01);
　　(Continued)

(58) Field of Classification Search
　　CPC ......... B32B 37/146; B32B 33/00; B32B 1/00; B32B 15/01; B32B 7/12; B32B 38/1866;
　　(Continued)

(56) References Cited

U.S. PATENT DOCUMENTS 3,283,118 A * 11/1966 Runkle .............. B23K 11/0093
　　　　　　　　　　　　　　　　　　　　219/79
3,501,367 A *  3/1970 Parker .................... B21D 47/00
　　　　　　　　　　　　　　　　　　　　428/116

(Continued)

FOREIGN PATENT DOCUMENTS

WO　　2006/049406 A1　　5/2006

OTHER PUBLICATIONS

Search Report issued in French Patent Application No. 15 54611 dated Mar. 9, 2016.

(Continued)

*Primary Examiner* — Sarang Afzali
*Assistant Examiner* — Darrell C Ford
(74) *Attorney, Agent, or Firm* — Pearne & Gordon LLP

(57) ABSTRACT

A method for producing a sandwich metal part (1) having a non-developable shape. The part including a metal honeycomb core (2) and two metal skins (4) arranged to either side of the core. The method including: a step of plastically deforming metal sheets (4') for obtaining the two metal skins (4); then, a step of rigidly connecting the two metal skins (4) to the core (2).

7 Claims, 5 Drawing Sheets

(51) Int. Cl.
  *B32B 3/12* (2006.01)
  *B32B 38/18* (2006.01)
  *B32B 7/12* (2006.01)
  *B32B 15/01* (2006.01)
  *B32B 1/00* (2006.01)
  *B32B 33/00* (2006.01)
  *B32B 37/10* (2006.01)
  *B60N 2/68* (2006.01)

(52) U.S. Cl.
  CPC ............ *B32B 15/01* (2013.01); *B32B 15/016* (2013.01); *B32B 33/00* (2013.01); *B32B 37/1284* (2013.01); *B32B 38/1866* (2013.01); *B60N 2/686* (2013.01); *B32B 37/1018* (2013.01); *B32B 2250/40* (2013.01); *B32B 2255/06* (2013.01); *B32B 2255/26* (2013.01); *B32B 2311/00* (2013.01); *B32B 2605/10* (2013.01); *B32B 2607/00* (2013.01)

(58) Field of Classification Search
  CPC ..... B32B 15/016; B32B 3/12; B32B 37/1284; B32B 37/1018; B32B 2607/00; B32B 2255/26; B32B 2255/06; B32B 2250/40; B32B 2605/10; B32B 2311/00; B60N 2/686; B21D 22/00
  USPC .................. 29/428, DIG. 29, 446, 448, 17.1
  See application file for complete search history.

(56) References Cited

U.S. PATENT DOCUMENTS

| | | | | |
|---|---|---|---|---|
| 3,655,478 A * | 4/1972 | Geschwender | ...... | B31D 3/0284 156/202 |
| 3,670,393 A * | 6/1972 | Almond | ................... | B21D 5/02 29/423 |
| 3,788,117 A * | 1/1974 | Chester | ................... | B21D 11/02 72/296 |
| 4,054,477 A * | 10/1977 | Curran | .................. | B31D 3/0207 156/197 |
| 4,127,691 A * | 11/1978 | Frost | ........................ | B01J 35/04 428/116 |
| 4,411,381 A * | 10/1983 | Ittner | ..................... | B21D 21/00 228/173.7 |
| 4,625,710 A * | 12/1986 | Harada | .................. | F28D 20/02 126/619 |
| 4,689,870 A * | 9/1987 | Mieyal | ..................... | E04C 2/36 29/469.5 |
| 5,063,647 A * | 11/1991 | Rohrer | ................. | B31D 3/0292 156/193 |
| 5,116,688 A * | 5/1992 | Minamida | .......... | B23K 26/0846 428/582 |
| 5,288,538 A * | 2/1994 | Spears | ................. | B29C 44/1228 428/116 |
| 5,370,921 A * | 12/1994 | Cedarleaf | ............... | B32B 15/14 428/138 |
| 5,437,936 A * | 8/1995 | Johnson | .................. | B21D 47/00 428/593 |
| 5,461,761 A * | 10/1995 | Knopfli | ................... | B21D 28/36 29/6.1 |
| 5,620,666 A * | 4/1997 | Usui | ................... | B01D 53/9454 29/890.08 |
| 6,272,897 B1 * | 8/2001 | Ciranna | ................. | B21D 25/02 72/296 |
| 2002/0189507 A1 * | 12/2002 | Benner | .............. | B65D 19/0012 108/51.3 |
| 2006/0000547 A1 * | 1/2006 | Roberge | ............ | B29C 66/83423 156/292 |
| 2009/0072441 A1 * | 3/2009 | Bracke | .................. | B29C 51/087 264/271.1 |
| 2010/0043955 A1 * | 2/2010 | Hornick | .............. | B29C 65/5057 156/182 |
| 2010/0104788 A1 * | 4/2010 | Kitano | .................... | B29C 51/12 428/36.4 |
| 2011/0223372 A1 * | 9/2011 | Metz | ........................ | B32B 5/02 428/80 |
| 2012/0040135 A1 * | 2/2012 | Werthen | .................... | B32B 3/02 428/138 |
| 2012/0147351 A1 * | 6/2012 | Jak | ....................... | G03F 7/70191 355/71 |
| 2013/0313039 A1 * | 11/2013 | Comon | ................ | B23K 26/123 181/292 |
| 2013/0337223 A1 * | 12/2013 | Jung | ....................... | B32B 15/02 428/116 |
| 2014/0030470 A1 * | 1/2014 | Gantner | .................... | B32B 3/04 428/76 |
| 2014/0326536 A1 * | 11/2014 | Vauchel | ............... | G10K 11/168 181/290 |
| 2015/0273787 A1 * | 10/2015 | Nansen | ..................... | B32B 3/12 428/116 |
| 2016/0263449 A1 * | 9/2016 | Morales | .................. | A63B 53/04 |
| 2017/0225428 A1 * | 8/2017 | Muir | ......................... | B32B 5/18 |
| 2018/0141050 A1 * | 5/2018 | Ryan | ........................ | B01L 9/02 |
| 2020/0381640 A1 * | 12/2020 | Joo | ............................ | G03F 7/20 |
| 2020/0398519 A1 * | 12/2020 | Takahira | ............... | B21D 47/00 |

OTHER PUBLICATIONS

International Search Report issued in Application No. PCT/EP2016/061206 dated Aug. 16, 2016.
Written Opinion issued in Application No. PCT/EP2016/061206 dated Aug. 16, 2016.
Anonymous, "Honeycomb Panel, Aluminum Honeycomb Panel, Aluminum Honeycomb Core Manufacturers", Jan. 12, 2015, http://web.archive.org/web/20150112141759/http://www.universalmetaltek.com/honeycomb_panel.htm.

* cited by examiner

METHOD FOR PRODUCING A SANDWICH METAL PART HAVING A NON-DEVELOPABLE SHAPE

TECHNICAL FIELD

The present invention relates to the production of sandwich type parts having a non-developable complex shape.

The invention is applicable to all technical fields which require complex shape parts, in particular to the fields of road, air, railway and sea transports.

STATE OF PRIOR ART

A sandwich type part has generally a honeycomb core as well as two skins arranged on either side of this core, and adhered to the same. This configuration type enables a large rigidity to be achieved while having a low overall weight. In this regard, it is noted that in a known manner, moving the skins apart on either side of the neutral fibre enables a very significant moment of inertia to be achieved, since this moment of inertia is proportional to the cube of the distance to the neutral fibre.

From prior art, there are so-called "metal" solutions consisting in making both the core and the skins of metal material, for example of aluminium or one of its alloys. These solutions usually lie in obtaining substantially planar shaped panels, comprising the skins adhered on either side of the core. Optionally, the panels thus obtained are then shaped, for example by folding, bending, etc. However, these additional rework steps do not enable final parts with complex shapes to be obtained, but at the very most, parts with a simple developable shape.

To produce metal parts having non-developable complex shapes, it is possible to provide a so-called "monolithic" solution in which the part is made as a single piece. Suitable techniques such as drawing thereby enable complex shapes to be achieved for the part, but the need for mechanical resistance usually leads to provide a part with a significant thickness, at the expense of its overall weight. This technique can thus turn out to be incompatible with the operating requirements encountered in some applications, in particular in the transport fields.

Obtaining sandwich parts with complex shapes is also possible using skins of composite material, for example a mixture of carbon fibres and/or glass fibres with a resin. However, this technique has many drawbacks with respect to the abovementioned metal sandwich solution. Among these drawbacks, the low rigidity and low impact resistance are mentioned, as well as the high manufacturing cost resulting in particular from the labour required to implement folds on tooling, the difficulty in implanting interface members on the composite sandwich part, the non-recyclability of the composite elements, the low resistance to fire-smoke criteria, etc.

DISCLOSURE OF THE INVENTION

One object of the invention is to solve at least partially the abovementioned drawbacks, related to the embodiments of prior art.

To that end, one object of the invention is a method for producing a sandwich type metal part having a non-developable shape, said part comprising a metal honeycomb core as well as two metal skins arranged on either side of the core, said method comprising:

a step of plastically deforming metal sheets for obtaining both metal skins; and then a step of securing both skins to the core.

The invention is thus totally discriminated from current technologies, by considering to plastically deform metal sheets in order to obtain metal skins having a complex shape, before being adhered to the core. This technique specific to the invention offers, for the part, final shape possibilities which are much more extended than those resulting from rework operations of a metal flat sandwich panel. Besides, because of the "sandwich" aspect of the part, this has a rigidity to weight ratio which is largely more satisfactory than that achieved with the monolithic solution of prior art. In the particular case of the transport field, this results in an economy saving for propelling the transport vehicle integrating this part.

Moreover, with respect to productions integrating skins of composite material, the invention provides many advantages, among which a stronger rigidity and a higher impact resistance, a reduced manufacturing cost mainly because of the absence of labour related to fold draping, an easier implantation of interface members on the metal sandwich part, a recyclability of the metal elements, or even a satisfactory resistance to fire-smoke criteria which improves passive security. Also, when the part has to be painted, the paint reworks are much lower than those observed with the composite solution, likely to have paint defects due to porosities on the composite part.

The invention preferably comprises at least one of the following optional characteristics, taken alone or in combination.

The method also comprises a step of plastically deforming the metal honeycomb core, implemented before said step of securing both skins to this core. However, depending on the desired final shape for the sandwich part, this plastic deformation step is not necessarily required. Indeed, the only elastic deformation of the honeycomb core can turn out to be sufficient for this core to assume a profile identical or similar to that of the desired final part. In the case where the elastic deformation of the core is not sufficient to achieve the desired profile, techniques other than plastic deformation can be contemplated. It is for example one or more cut-outs within the core in order to relieve stresses, or even producing suitable machinings on this core. In both cases, it results in an increase in the elastic deformability of the honeycomb core.

Preferably, when a plastic deformation of the core is implemented, an elastic stretching is applied to this core during its plastic deformation. This stretching enables the honeycomb cells to be flattened in some way, for them to assume a shape which thereby is closer to that of a rectangle than a hexagon, corresponding to the initial shape of these cells. Besides, it is also possible to contemplate a honeycomb core with rectangular shaped cells at the unstressed neutral state.

By virtue of the substantially rectangular stretched shape of the cells, the core has a greater ability to be deformed in several directions, which makes it easier to obtain a profile with a complex non-developable shape.

Preferably, the step of plastically deforming the metal sheets to obtain two metal skins is made using at least one of the following techniques: sheet-metal work, body making, incremental forming, drawing, rubber forming, thermoforming. In this regard, it is noted that the incremental forming technique is favoured for manufacturing a small series of parts, whereas the drawing technique is preferred for manufacturing a medium or a large series of parts.

Preferably, both skins each have a thickness between 0.5 and 3 mm, and/or the core has a thickness between 3 and 50 mm.

Preferably, the step of securing both skins to the core is made using a polymerisable adhesive, by placing the skins and the core in a mould equipped with a vacuum bag. Both skins are thereby preferentially adhered before being placed in the mould.

Finally, the skins and core are each made of aluminium or one of its alloys, even if other metal materials can be contemplated, without departing from the scope of the invention.

Another object of the invention is also to provide a transport vehicle comprising at least one metal part obtained by implementing the above-described method.

Preferably, it is a railway transport vehicle, but other applications are contemplatable, as a road, air or sea transport vehicle.

Further advantages and characteristics of the invention will appear in the detailed non-limiting description below.

BRIEF DESCRIPTION OF THE DRAWINGS

This description will be made in regard to the appended drawings in which.

DETAILED DISCLOSURE OF PREFERRED EMBODIMENTS

Figure 1:
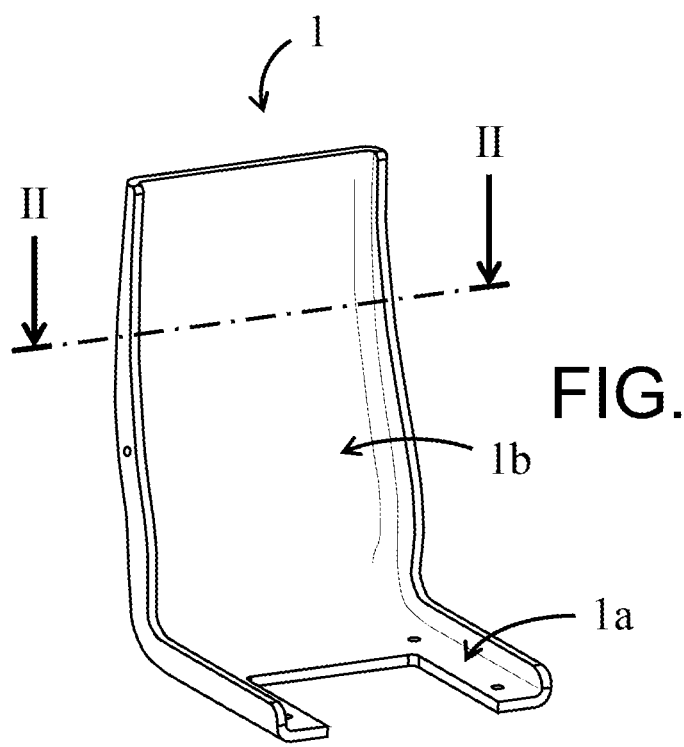
FIG. 1 represents a perspective view of a passenger seat for a railway vehicle, intended to be obtained by a method according to the invention.

First in reference to FIG. 1, there is represented a sandwich type metal part, obtained by a manufacturing method according to the invention. In this example, it is a passenger seat for a railway vehicle, but the invention is not limited to this field. The invention is actually applicable to the manufacture of any sandwich part having a complex non-developable shape, called a complex 3D shape. It can be for example a warped, a double curvature shape, etc., as opposed to simpler shapes such as flat and developable shapes. It is noted that within the context of this invention, the notion of developable shape/surface corresponds to the usual definition, that is a shape/surface set such that the tangent plane is the same along a generatrix. It is thereby possible to "roll without gliding" such a developable shape/surface on a plane, the contact being made along a straight line, as for a cylinder or a cone.

The invention is more particularly applicable to the fields of road, air, railway and sea transports, for making ultra-light and ultra-rigid parts, for the structure or covering of a transport vehicle. Exemplary applications are mentioned below:

passenger seat (shell and structure within a single sandwich part);
aperture mask (covering part for a window border);
end part: train, tramway or bus "nose";
air conditioner cowl located above a bus;
all or part of a wheel rim of an automotive vehicle.

Figure 2:
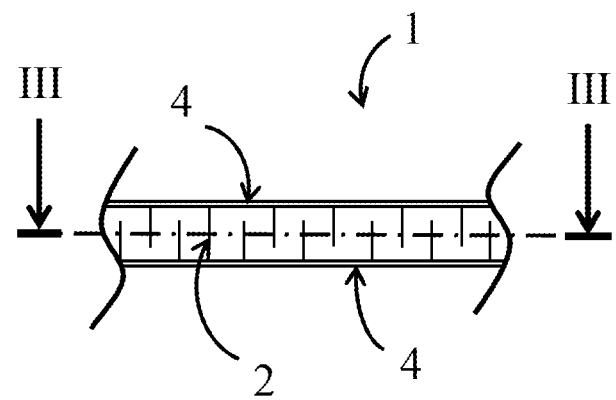
FIG. 2 represents a cross-section view taken along line II-II of FIG. 1.
Figure 3:
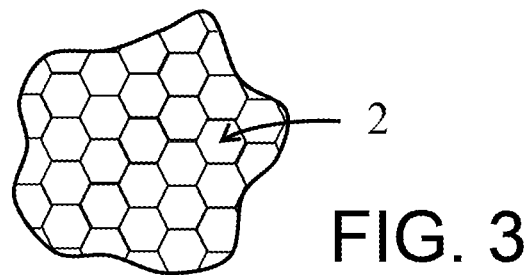
FIG. 3 represents a cross-section view taken along line III-Ill of FIG. 2.

In reference to FIGS. 1 to 3, a metal part 1 is thus represented, taking the form of a passenger seat for a railway vehicle. This part 1 is obtained by a manufacturing method specific to the present invention, and which will be described in more detail hereinafter. The part 1 has a thickness which is substantially constant, for example in the order of 5 to 20 mm. However, this thickness could vary within the part 1, without departing from the scope of the invention. The part 1 has a major dimension that can range for example from 1 m to 2 m, the major dimension corresponding to the maximum spacing distance between any two points of the part 1.

The part 1 has a seat part 1a and a backrest 1b. Other elements which not represented are intended to be subsequently assembled to this part 1, as for example inserts for attaching armrests, screws, braces, etc.

The metal part 1 is of the sandwich type, that is it has a honeycomb core 2 as well as two metal skins 4 arranged on either side of the core, and adhered to the same. These three constituent elements 2, 4 are made of aluminium or one of its alloys. Each skin 4 has a thickness between 0.5 and 3 mm, whereas the core 2 has a thickness for example between 3 and 50 mm. Each of these three elements 2, 4 extends on the entire surface of the final part 1, by assuming an overall shape identical or similar to that of the same final part, while having a lower thickness. Thus, it is the superimposition of these three elements 2, 4 which enables the metal sandwich part 1 to be obtained.

Figure 4:
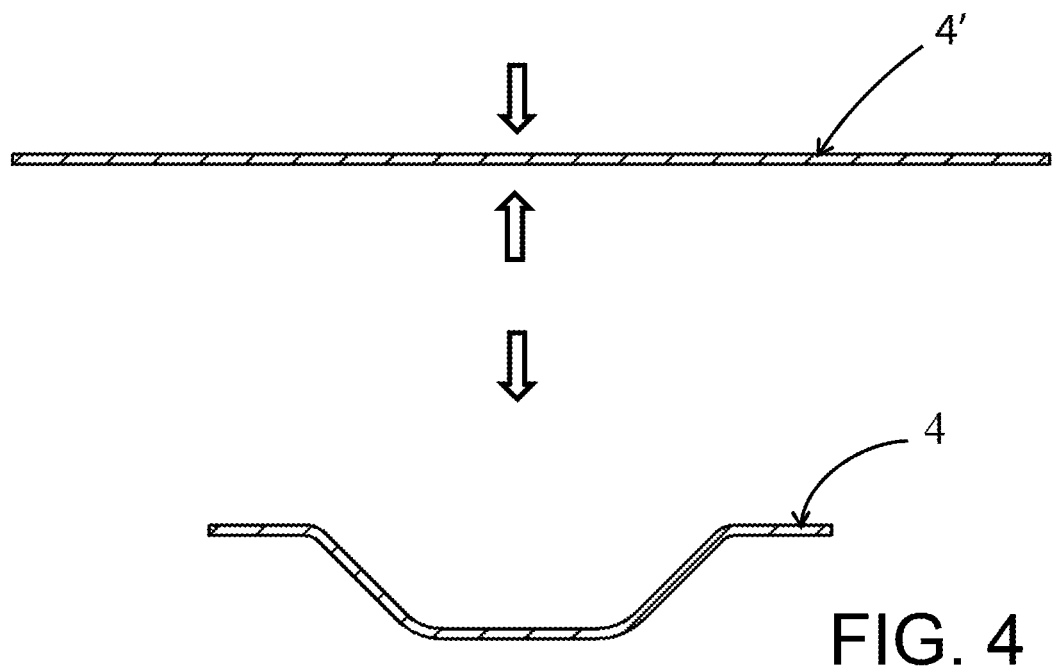
FIG. 4 illustrates a step of plastically deforming a metal sheet, during the implementation of a manufacturing method according to a preferred embodiment of the invention.
Figure 5A:
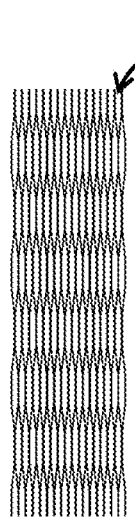
FIGS. 5a to 5f represent different views depicting a step of plastically deforming the honeycomb core.
Figure 5B:
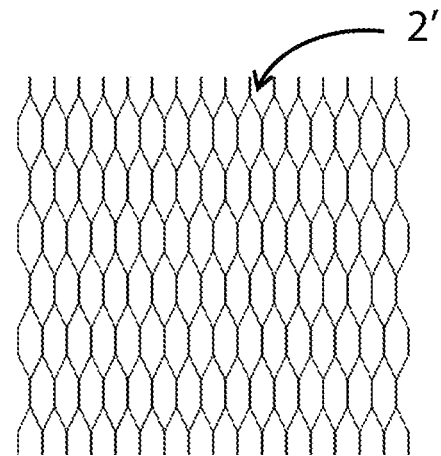
Figure 5C:
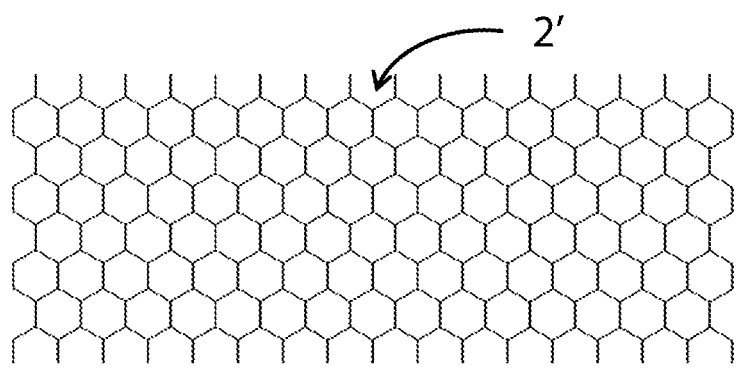
Figure 5D:
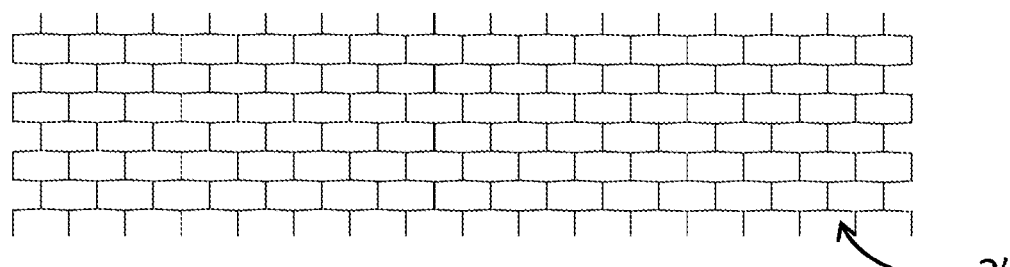
Figure 5E:
Figure 5E:
Figure 5E:
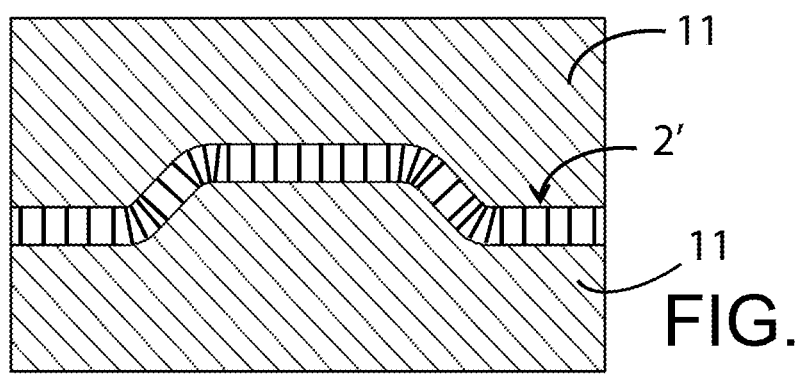
Figure 5F:
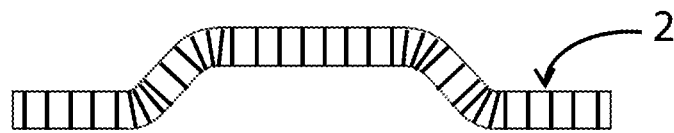

FIG. 4 and the following figures illustrate a preferred embodiment of the method for manufacturing the part 1. However, for the sake of clarity and understanding of the figures, the part 1 has been represented therein according to a simpler shape than that of the seat shown in FIG. 1. However, as indicated above, it should be understood that the part intended to be obtained by the method according to the invention has actually a non-developable 3D complex surface, as a warped or a double curvature shape, etc.

The first step of the method is depicted in FIG. 4. It consists, for each of both skins 4, from a planar metal sheet 4', in plastically deforming it such that it assumes a shape substantially identical to that of the final part, however with a necessarily lower thickness. To carry out this plastic deformation, several techniques can be contemplated. One of the preferred techniques is the incremental forming, chosen for making a small series of parts. This rapid prototyping technique is based in a known manner on a local plastic deformation principle of a metal sheet, in order to gradually shape it. A more conventional drawing solution is preferentially selected for manufacturing parts in a medium or large series.

Then, a step of plastically deforming the metal honeycomb core is implemented, depicted in FIGS. 5a to 5f.

It consists, from a flat honeycomb element, in plastically deforming it such that it assumes a shape substantially identical to that of the final part, with once again a necessarily lower thickness. To carry out this deformation, a honeycomb flat element 2' is stretched in the plane of this element, as has been depicted in FIGS. 5a to 5d. In other words, the stretching of the element 2' is continued after obtaining hexagonal shaped cells shown in FIG. 5c, until these cells assume a substantially rectangular shape, shown in FIG. 5d. By virtue of this stretched shape, the element 2' has a greater ability to be deformed in several directions without breaking, which facilitates obtaining a profile with a non-developable complex shape. This step is then continued by plastically deforming the stretched element 2', as has been depicted in FIG. 5*e*, for example by drawing using a suitable tooling 11. The drawing results in folding some walls of the honeycomb element 2', which enables the core 2 shown in FIG. 5*f* and having an overall shape identical or similar to that of the desired final part to be obtained. The folding is more or less significant depending on the desired curvature.

Once the three elements 2, 4 are obtained for making up the sandwich part 1, a last, securing step aiming at attaching the deformed skins 4 to the deformed core 2 is implemented. This step is depicted in FIGS. 6*a* to 6*d*.

Figure 6A:
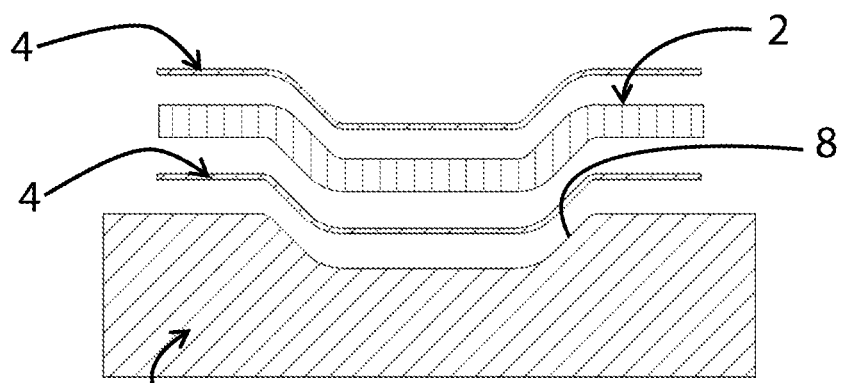
FIGS. 6a to 6d represent different views depicting a step of securing both skins to the honeycomb core.
Figure 6B:
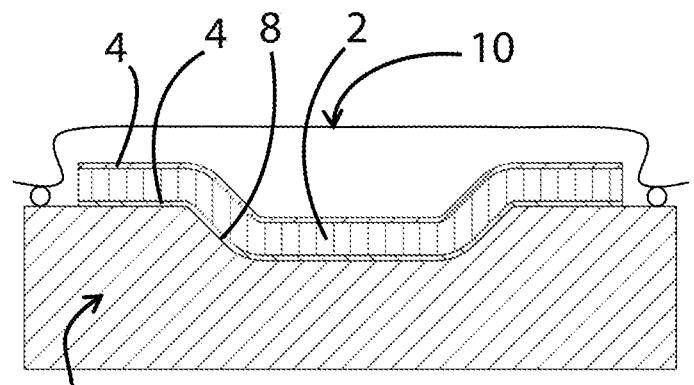

To that end, both skins 4 are first adhered using a polymerisable adhesive, for example an epoxy adhesive. As shown in FIG. 6*a*, both skins 4 and the honeycomb core 2 are then placed in a superimposed manner in a mould 6, the mould cavity 8 of which has a shape corresponding to that of the external surface of the skin 4 located below in the stack. As illustrated in FIG. 6*b*, the step is continued by placing a vacuum bag 10 on the upper part of the mould, such that the same fits smugly the external surface of the skin 4 located above in the stack.

Figure 6C:
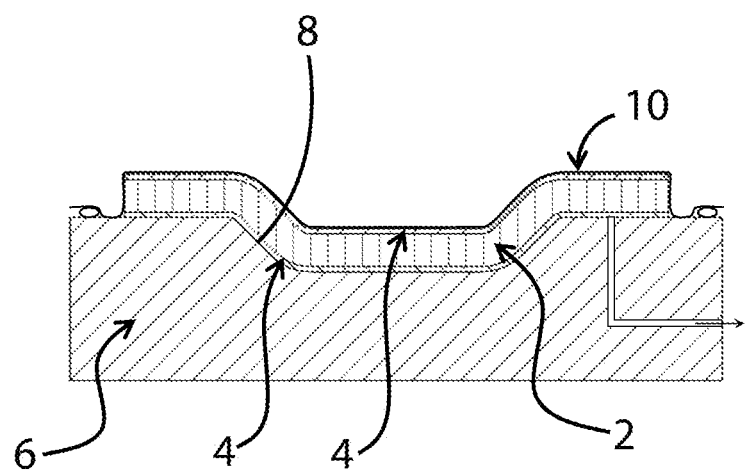

Then, FIG. 6*c* shows that a depression is applied in the space located between the body of the mould and its bag 10, such that the latter exerts a uniform pressure to the stack of the elements 2, 4. The depression applied is about 0.9 bar, which enables a pressure in the order of 9 t/m$^2$ to be obtained.

Figure 6D:
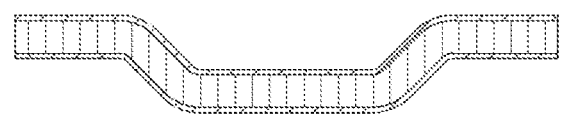

Once the adhesive is polymerised, the completed part 1 can be extracted from the mould, as is depicted in FIG. 6*d*.

Of course, various modifications can be provided by those skilled in the art to the invention that has just been described, only by way of non-limiting examples.

What is claimed is:

1. A method for producing a sandwich type metal part having a non-developable shape, said part comprising a metal honeycomb core as well as two metal skins arranged on either side of the metal honeycomb core, said method comprising:
    a step of plastically deforming metal sheets for obtaining both metal skins; and then
    a step of plastically deforming the metal honeycomb core in order to have an overall shape corresponding to that of a desired final part to be obtained, and before said step of plastically deforming the metal honeycomb core, said metal honeycomb core being obtained from a flat metal honeycomb core having hexagonal-shaped cells that are stretched so at least some of the hexagonal-shaped cells are plastically deformed to cells that are rectangular-in-shape, and then
    a step of securing both metal skins to the metal honeycomb core.

2. The method according to claim 1, wherein during said step of plastically deforming the metal honeycomb core, an elastic stretching is applied to said core.

3. The method according to claim 1, wherein the step of plastically deforming the metal sheets for obtaining both metal skins is made using at least one of the following techniques: sheet-metal work, body making, incremental forming, drawing, rubber forming, thermoforming.

4. The method according to claim 1, wherein at least one of both metal skins each have a thickness between 0.5 and 3 mm, and the core has a thickness between 3 and 50 mm.

5. The method according to claim 1, wherein the step of securing both metal skins to the core is made using a polymerisable adhesive, by placing the metal skins and the core in a mould equipped with a vacuum bag.

6. The method according to claim 5, wherein both metal skins are adhered before being placed in the mould.

7. The method according to claim 1, wherein the metal skins and the core are each made of aluminum or an alloy of aluminum.

* * * * *